United States Patent
Wang

(10) Patent No.: US 11,952,979 B2
(45) Date of Patent: Apr. 9, 2024

(54) DOUBLE-LAYER REVERSE ROTATION VERTICAL SHAFT POWER MACHINE ADOPTING HORIZONTAL COMBINED MOVABLE WING

(71) Applicant: Zhaotai Wang, Shandong (CN)

(72) Inventor: Zhaotai Wang, Shandong (CN)

( * ) Notice: Subject to any disclaimer, the term of this patent is extended or adjusted under 35 U.S.C. 154(b) by 78 days.

(21) Appl. No.: 17/826,101

(22) Filed: May 26, 2022

(65) Prior Publication Data
US 2022/0282700 A1   Sep. 8, 2022

Related U.S. Application Data

(63) Continuation-in-part of application No. 13/586,868, filed on Aug. 16, 2012, now abandoned.

(51) Int. Cl.
| F03D 3/00 | (2006.01) |
| F03D 15/00 | (2016.01) |
| F16H 1/22 | (2006.01) |

(52) U.S. Cl.
CPC ............ F03D 3/005 (2013.01); F03D 15/00 (2016.05); F16H 1/222 (2013.01); *F05B 2260/40312* (2020.08)

(58) Field of Classification Search
CPC . F03D 3/06; F03D 3/062; F03D 3/067; F03D 3/068; F03D 3/005; F03D 15/00; F03D 3/02; F16H 1/222; F05B 2260/40312
See application file for complete search history.

(56) References Cited

U.S. PATENT DOCUMENTS

| 4,382,190 A * | 5/1983 | Jacobson | F03D 9/25 290/55 |
| 5,083,902 A * | 1/1992 | Rhodes | F03D 3/067 416/132 B |
| 6,682,302 B2 * | 1/2004 | Noble | F03D 3/068 416/197 R |

(Continued)

FOREIGN PATENT DOCUMENTS

| AT | 525831 A1 * | 8/2023 | ............... F03D 3/06 |
| CN | 101493071 A * | 7/2009 | ............... F03D 3/00 |
| WO | WO-2011140702 A1 * | 11/2011 | ............. F03D 3/068 |

*Primary Examiner* — J. Todd Newton
(74) *Attorney, Agent, or Firm* — Chun-Ming Shih; LANWAY IPR SERVICES

(57) ABSTRACT

A double-layer reverse rotation vertical shaft power machine adopting a horizontal combined movable wing relates to the technical field of green energy generating sets, which includes main body devices, movable wing devices, transmission devices and a self-clutch device; each movable wing device includes combined wings vertically arranged along the circumferential direction of the main body devices, each combined wing includes combined shafts and combined movable wings connected to the combined shafts, and the combined shafts vertically arranged along the circumferential direction are alternately arranged according to the axial length. The combined shafts that are alternately distributed along the circumferential direction in turn can effectively stagger the adjacent combined movable wings and avoid the mutual interference between the adjacent combined movable wings, thereby reasonably using all combined movable wings, fully obtaining the outside potential energy and improving the efficiency.

5 Claims, 7 Drawing Sheets

(56) References Cited

U.S. PATENT DOCUMENTS

| | | | | |
|---|---|---|---|---|
| 2003/0161729 A1* | 8/2003 | Lindhorn | ................ | F03D 3/067 416/117 |
| 2008/0075594 A1* | 3/2008 | Bailey | ..................... | F03D 3/068 416/104 |
| 2008/0121752 A1* | 5/2008 | Chen | ....................... | B64C 27/59 415/4.5 |
| 2009/0297347 A1* | 12/2009 | Burr | ....................... | F03D 3/068 416/147 |
| 2011/0091322 A1* | 4/2011 | Deeley | .................. | F03D 3/068 416/98 |
| 2012/0121380 A1* | 5/2012 | Tein | .................... | H02K 7/1876 415/4.2 |
| 2016/0208774 A1* | 7/2016 | West | ........................ | F03D 3/02 |
| 2022/0282700 A1* | 9/2022 | Wang | ..................... | F16H 1/222 |

\* cited by examiner

DOUBLE-LAYER REVERSE ROTATION VERTICAL SHAFT POWER MACHINE ADOPTING HORIZONTAL COMBINED MOVABLE WING

TECHNICAL FIELD

The present disclosure relates to the technical field of green energy generating sets, in particular to a double-layer reverse rotation vertical shaft power machine adopting a horizontal combined movable wing.

BACKGROUND

With the growing demand for electricity and changes in the earthly environment, UNEP repeatedly appeals to people to live a low-carbon life, and to explore and develop green energy and zero-carbon energy. Wind power utilization has been already in full swing at present. Although a wind driven generator has been entered the fourth generation (Galileo wind turbine), it still does not break out of a model of a traditional horizontal shaft. Therefore, it is still troubled by steering, reversing, component force work on a blade through wind energy, and so on, resulting in a lower efficiency. Now a vertical shaft wind turbine is invented, which can drive a double-layer reverse rotation main body to realize the conversion of the wind energy through a combined wing. But during the conversion process of the wind energy, adjacent wings will be mutually interfered in a horizontal direction, so the full use of the wind energy cannot be achieved, thereby affecting the efficiency of the wind turbine, and the structure is complex.

In addition, the specific gravity of sea water is N times of air, and certainly the potential energy is also N times of the wind energy. Although people have researched and developed tidal power generation since many years ago, a traditional tidal power generation device is not easy to promote due to its huge quantities and maintenance cost, and the utilization of wave energy is basically zero. After searching the related patents, the applicant has found that most of wave power generation devices convert the energy of wave fluctuation motion into kinetic energy, there are few devices using the reciprocating rectilinear motion energy of the wave, and the efficiency is not high through theoretical analysis. Although the structure of the above vertical shaft wind turbine can be used for wave power generation, due to the wave periodic characteristic, this potential energy cannot be effectively and evenly converted by directing adopting the above vertical shaft wind turbine, thereby affecting its efficiency.

SUMMARY

The purpose of the present disclosure is to provide a double-layer reverse rotation vertical shaft power machine adopting a horizontal combined movable wing, so as to solve the technical problems of low efficiency and complex structure of an existing vertical shaft wind turbine. Many technical effects generated by the preferable technical solution in many technical solutions provided in the present disclosure are as details as below.

In order to achieve the above purpose, the present disclosure adopts the technical solution below:

A double-layer reverse rotation vertical shaft power machine adopting a horizontal combined movable wing provided by the present disclosure includes two upper and lower reverse rotation main body devices, movable wing devices are arranged on the main body devices, wherein each main body includes a main body and a power output shaft that are coaxially arranged, and a transmission device is arranged in the main body. Each movable wing device includes combined wings that are uniformly arranged along a circumferential direction of the corresponding main body, each combined wing includes combined shafts and combined movable wings connected to the combined shafts, and the combined shafts distributed in the circumferential direction are alternately arranged in turn according to the axial length.

Preferably, the quantity of each layer of the combined wing is four, and two symmetrically arranged combined wings are in transmission connection through the transmission device.

Preferably, the transmission device includes a transmission mechanism, wherein the two opposite sides of the transmission mechanism are provided with upper output ends and lower output ends that rotate synchronously and reversely, each combined shaft includes an upper cantilever and a lower cantilever that are arranged in parallel as well as an upper connecting rod and a lower connecting rod that are respectively arranged in the upper cantilever and the lower cantilever, and each combined movable wing includes an upper wing mechanism and a lower wing mechanism. One end of the upper connecting rod is connected to the corresponding upper output end, and the other end of the upper connecting rod is in flange connection with the corresponding upper wing mechanism through an upper flange plate. One end of the lower connecting rod is connected to the corresponding lower output end, and the other end of the lower connecting rod is in flange connection with the corresponding lower wing mechanism through a lower flange plate.

Preferably, the transmission mechanism includes an upper transmission rod and a lower transmission rod, wherein the two ends of the upper transmission rod are provided with upper transmission gears, the two ends of the lower transmission rod are provided with lower transmission gears, and the corresponding upper transmission gears mesh with the lower transmission gears. The two ends of the upper transmission rod are formed with two upper output ends, and the two ends of the lower transmission rod are formed with two lower output ends.

Preferably, the transmission device includes a transmission box, the transmission mechanism is arranged in the transmission box, the transmission box includes a box body and a box cover that can be detachably arranged at the top of the box body, wherein the box body includes four box plates connected circumferentially, and detachable plates are arranged on the box plates. Two mounting holes are formed in the side of each box plate along a vertical direction, a sliding bearing with an end face is arranged in each mounting hole, and the end of the upper transmission rod and the end of the lower transmission rod are respectively arranged in the corresponding sliding bearing.

Preferably, an outer wall of a zone, in which the upper connecting rod is associated with the upper output end, is provided with an upper spiral guide slot, an upper guide key is arranged at a position where the upper transmission rod corresponds to the upper spiral guide slot, and the upper guide key is in sliding fit with the upper spiral guide slot. An outer wall of a zone, in which the lower connecting rod is associated with the lower output end, is provided with a lower spiral guide slot, a lower guide key is arranged at a position where the lower transmission rod corresponds to the lower spiral guide slot, the lower guide key is in sliding fit with the lower spiral guide slot, and the rotation direction of the lower spiral guide slot is opposite to that of the upper spiral guide slot.

Preferably, the upper connecting rod is provided with an upper resisting portion, which resists to the end face of the corresponding sliding bearing, an upper elastic member is sleeved on the upper connecting rod, and the two ends of the upper elastic member resist to an upper fastening nut and an end cover outside the corresponding upper cantilever. The lower connecting rod is provided with a lower resisting portion, which resists to the end face of the corresponding sliding bearing, a lower elastic member is sleeved on the lower connecting rod, and the two ends of the lower elastic member resist to a lower fastening nut and an end cover outside the corresponding lower cantilever.

Preferably, the blade of the combined wing may be made of degradable materials.

Preferably, when used for wave power generation, the double-layer reverse rotation vertical shaft power machine adopting the horizontal combined movable wing further includes a self-clutch device, which includes a driving disk and a driven disk, wherein the driving disk includes an output gear, which is in transmission connection with the main body device, and a central shaft and a pawl are arranged on the end face of the output gear. The driven disk includes a flywheel, which can be rotationally sleeved on the central shaft. Relatively to the central shaft, a ratchet ring is annularly arranged on the end face, closing to the output gear, of the flywheel, and the pawl meshes with the ratchet ring.

The double-layer reverse rotation vertical shaft power machine adopting the horizontal combined movable wing provided by the present disclosure at least has the following beneficial effects:

The double-layer reverse rotation vertical shaft power machine adopting the horizontal combined movable wing includes two upper and lower reverse rotation main body devices, movable wing devices are arranged on the main body devices, each main body includes a main body and a power output shaft that are coaxially arranged, and a transmission device is arranged in each main body. The main body with the transmission device is used for installing the movable wing devices and delivering the kinetic energy of the movable wing devices. The power output shaft is used for outputting the kinetic energy, the movable wing device drives the main body to rotate under the action of wind power or water power, so as to effectively convert wind energy or water energy.

Through reverse rotation, the upper and lower main body devices and the movable wing devices can effectively offset the imbalance during the rotation action, so that the rotation is more stable, thus the conversion effect of the wind energy and the water energy can be effectively ensured.

The movable wing device includes the combined wings that are uniformly arranged relatively to the circumferential direction of the main body, each combined wing includes combined shafts and combined movable wings connected to the combined shafts, and the combined shafts distributed in the circumferential direction are successively arranged in turn according to the axial length. During the actual use, the combined wings uniformly arranged in the circumferential direction can effectively convert the wind energy or water energy into the kinetic energy through which the main body can rotate for externally connecting a working unit or generation. The setting of the long and short shafts in the circumferential direction can effectively avoid the interference between the adjacent combined wings, so that the energy can be used fully, and the efficiency is improved.

BRIEF DESCRIPTION OF THE DRAWINGS

To better clarify the embodiment of the present disclosure or the technical solution in the prior art, the drawings required to illustrate the embodiments or the prior art will be simply described below. It is apparent that the drawings described below merely illustrate some embodiments of the present disclosure. Those ordinarily skilled in the art can obtain other drawings without creative labor on the basis of those drawings.

REFERENCE SIGNS

1. Main body device; 11. Power output shaft of upper main body device; 12. Power output shaft of lower main body device; 13. Main body; 14. Wind tower; 15. Upper cover; 16. Upper cantilever; 161. Upper sliding bearing; 17. Lower cantilever; 171. Lower sliding bearing; 18. End cover; 19. Sealing ring; 2. Movable wing device; 21. Combined shaft; 211. Upper connecting rod; 2111. Upper flange plate; 2112. Upper spiral guide slot; 2113. Upper resisting portion; 2114. Upper screw; 2115. Upper elastic member; 2116. Upper fastening nut; 212. Lower connecting rod; 2121. Lower flange plate; 2122. Lower spiral guide slot; 2123. Lower resisting portion; 2124. Lower screw; 2125. Lower elastic member; 2126. Lower fastening nut; 22. Combined movable wing; 221. Upper wing mechanism; 2211. Blade shaft; 2212. Blade; 222. Lower wing mechanism; 3. Transmission device; 31. Transmission mechanism; 311. Upper output end; 312. Lower output end; 313. Upper transmission rod; 314. Lower transmission rod; 315. Upper transmission gear; 316. Lower transmission gear; 32. Transmission box; 321. Box plate; 3211. Mounting hole; 322. Box cover; 323. Sliding bearing; 33. Locating bearing; 4. Self-clutch device; 41. Driving disk; 411. Output gear; 412. Central shaft; 413. Pawl; 414. Hanging lug; 415. Mounting shaft; 42. Driven disk; 421. Flywheel; 422. Ratchet ring; 423. Driven bearing.

DETAILED DESCRIPTION OF THE EMBODIMENTS

In order to make the objectives, technical solution and advantages of the embodiments of the present disclosure clearer, the technical solution of the present disclosure will be described in detail below. It is apparent that the described embodiments are only a part of the embodiments of the present disclosure but not all. Based on the embodiments of the present disclosure, all the other implementation modes obtained by those of ordinary skill in the art on the premise of not contributing creative effort should belong to the protection scope of the present disclosure.

Embodiment 1

Figure 1:
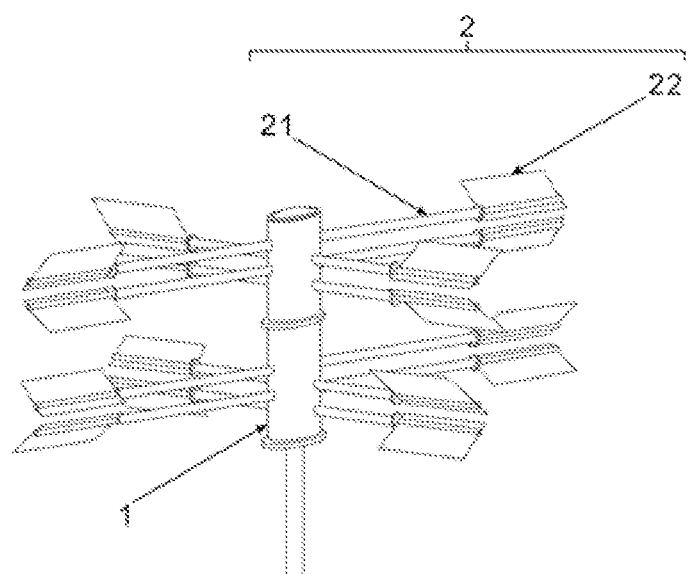
FIG. 1 is a schematic diagram of a structure of the present disclosure.
Figure 2:
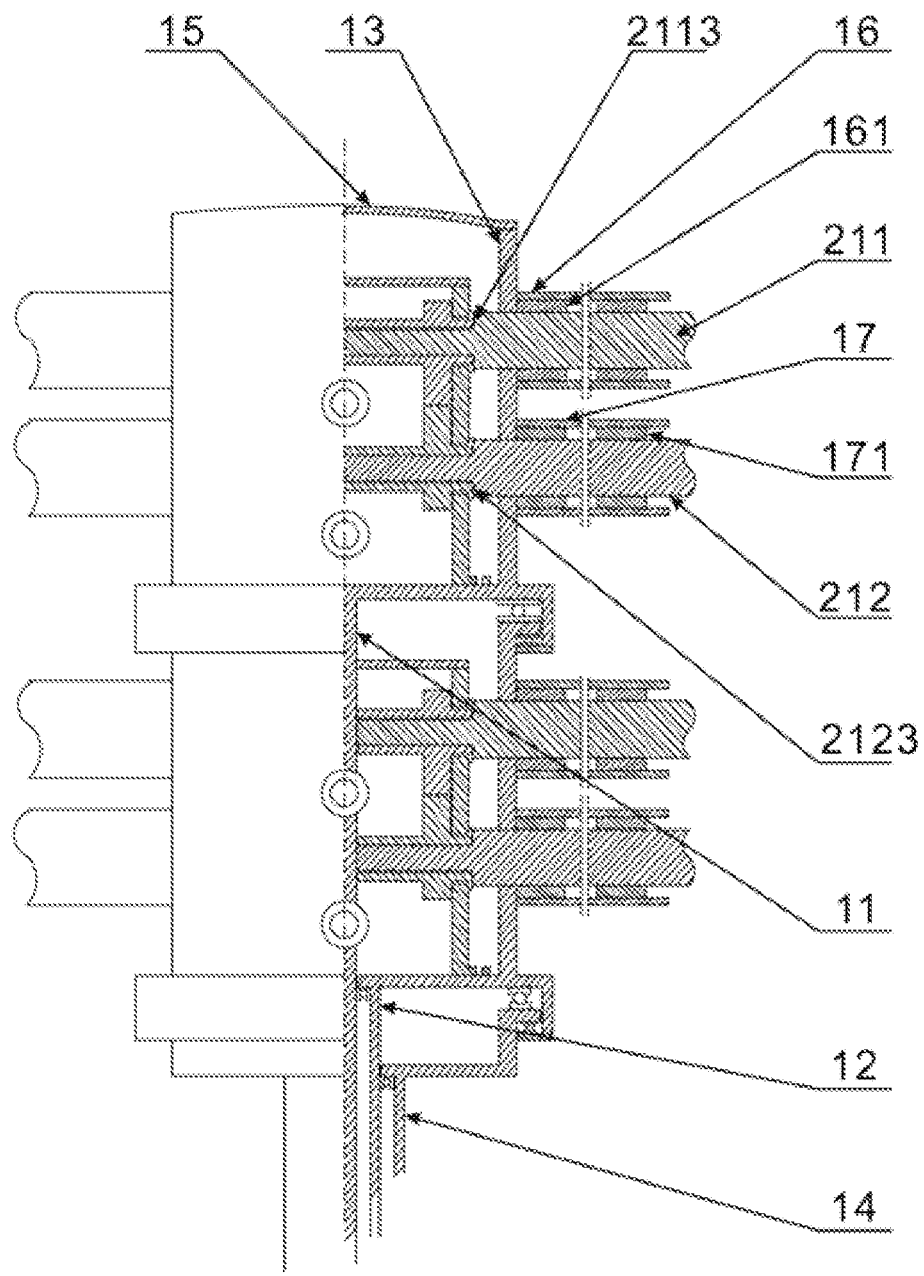
FIG. 2 is a schematic diagram of an assembly section view of the present disclosure.

The present disclosure provides a double-layer reverse rotation vertical shaft power machine adopting a horizontal combined movable wing, as shown in FIG. 1 and FIG. 2, the double-layer reverse rotation vertical shaft power machine adopting the horizontal combined movable wing includes two upper and lower reverse rotation main body devices 1, and movable wing devices 2 are arranged on the main body devices 1.

Each main body device 1 includes a main body 13 and a power output shaft that are arranged coaxially, and a transmission device 3 is arranged in the main body 13.

The main body device located at the upper layer includes an upper cover 15, which is arranged at the top side of the upper layer main body. The main body device located at the lower layer includes a wind tower 14, which is arranged at the bottom side of the lower layer main body.

Each movable wing device 2 includes the combined wings that are uniformly arranged relatively to the circumferential direction of the main body 13, each combined wing includes combined shafts 21 and combined movable wings 22 connected to the combined shafts 21, and the combined shafts 21 distributed in the circumferential direction are successively arranged in turn according to the axial length.

During use, the combined wings drive the main body 13 to rotate through the action of the wind power or water power, so that the wind energy or the water energy can be converted to rotational kinetic energy.

The combined shafts 21 that are alternately distributed along the circumferential direction in turn according to the length can effectively stagger the adjacent combined movable wings 22 and avoid the mutual interference between the adjacent combined movable wings 22, thereby reasonably using all combined movable wings 22, fully obtaining the energy and improving the efficiency.

Preferably, the difference value of the axial length of the adjacent combined movable wings 22 is just the axial length of one combined movable wing 22.

The movable wing device corresponding to the upper layer main body device and the movable wing device corresponding to the lower layer main body have the opposite stress surfaces, the upper layer main body device and the lower layer main body device rotate reversely to offset the imbalance during the rotation action effectively, so that the rotation is more stable, and then the conversion efficiency of the wind energy or the water energy is effectively ensured and the stability of the wind tower 14 is ensured.

As an optional implementation mode, as shown in FIG. 1, the quantity of each layer of the combined wing is four, an included angle of the adjacent combined wings is 90 degrees, and two symmetrically arranged combined wings are in transmission connection through the transmission device 3.

As an optional implementation mode, as shown in FIG. 2-FIG. 5, the transmission device 3 includes a transmission mechanism 31.

The two opposite sides of the transmission mechanism 31 are provided with upper output ends 311 and lower output ends 312 that rotate synchronously and reversely, each combined shaft 21 includes an upper cantilever 16 and a lower cantilever 17 that are arranged in parallel as well as an upper connecting rod 211 and a lower connecting rod 212 that are respectively arranged in the upper cantilever 16 and the lower cantilever 17. The upper cantilever 16 and the lower cantilever 17 are connected to the outer wall of the main body 13, an upper sliding bearing 161 is arranged in the upper cantilever 16, the upper cantilever 16 is in sliding association with the upper connecting rod 211 through the upper sliding bearing 161, a lower sliding bearing 171 is arranged in the lower cantilever 17, the lower cantilever 17 is in sliding association with the lower connecting rod 212 through the lower sliding bearing 171, and each combined movable wing 22 includes an upper wing mechanism 221 and a lower wing mechanism 222.

One end of the upper connecting rod 211 is connected to the corresponding upper output end 311, and the other end of the upper connecting rod 211 is in flange connection with the corresponding upper wing mechanism 221 through an upper flange plate 2111. One end of the lower connecting rod 212 is connected to the corresponding lower output end 312, and the other end of the lower connecting rod 212 is in flange connection with the corresponding lower wing mechanism 222 through a lower flange plate 2121. Such setting is convenient for transportation, construction and later maintenance.

The upper wing mechanism 221 includes a blade shaft 2211 and a blade 2212, the blade 2212 is arranged on the blade shaft 2211, the blade 2212 includes a first zone and a second zone that are arranged at the two sides of the blade shaft 2211, the first zone and the second zone have the same axial length, the radial length of the first zone relative to the blade shaft 2211 is greater than that of the second zone relative to the blade shaft 2211, and the ratio of the radial lengths of the first zone and the second zone is set according to a golden cut ratio.

The lower wing mechanism 222 is of the same structure with the upper wing mechanism 221, and the second zone of the upper mechanism 221 is adjacent to that of the lower wing mechanism 222.

The upper output end 311 and the lower output end 312 are arranged synchronously and reversely, so that the combined wing can be automatically adjusted along the wind power and the wind direction, thereby obtaining the wind energy completely, and the adjusting process is as follows:

During static, the lower wing mechanism 222 sags naturally due to the gravity, the upper wing mechanism 221 upwarps simultaneously, preferably an included angle between the lower wing mechanism 222 and the upper wing mechanism 221 is 90 degrees, and this state is called "unstable balance".

When the combined wing is subjected to the wind power, the upper wing mechanism 221 and the lower wing mechanism 222 of a downwind wing are opened under the action of the wind power, and the upper wing mechanism 221 and the lower wing mechanism 222 of a headwind wing are closed under the action of the wind power. The maximum opening angle between the upper wing mechanism 221 and the lower wing mechanism 222 of the downwind wing is 180 degrees, and the minimum closing angle between the upper wing mechanism 221 and the lower wing mechanism 222 of the headwind wing is 0 degree.

During the above process, the opening angle is 180 degrees, the combined wing that rotates along the wind direction under the action of the wind power so as to drive the main body to work is the downwind wing, and the combined wing opposite to the downwind wing is the headwind wing.

Figure 5:
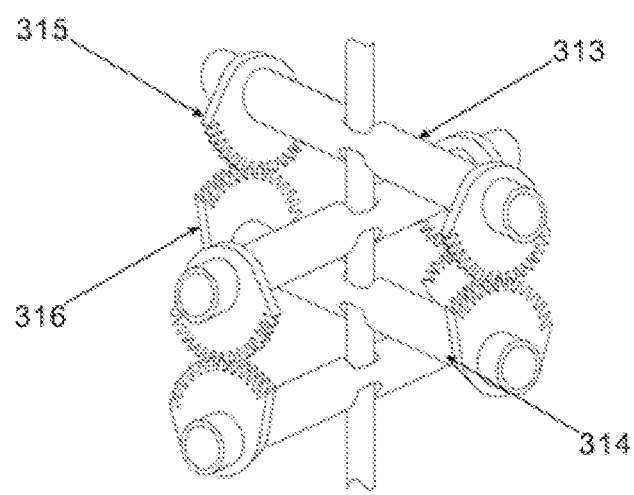
FIG. 5 is a schematic diagram of a transmission mechanism structure of the present disclosure.

As an optional implementation mode, as shown in FIG. 5, the transmission device 31 includes an upper transmission rod 313 and a lower transmission rod 314.

The two ends of the upper transmission rod 313 are provided with upper transmission gears 315, the two ends of the lower transmission rod 314 are provided with lower transmission gears 316, and the corresponding upper transmission gears 315 meshes with the lower transmission gears 316. The two ends of the upper transmission rod 313 are formed with two upper output ends 311, and the two ends of the lower transmission rod 314 are formed with two lower output ends 312.

The use of the upper transmission rod 313 and the lower transmission rod 314 not only improves the structure strength effectively, but also ensures the concentricity of the opposite transmission gears effectively.

By adopting a gear structure, the two combined wings that are arranged oppositely can be formed with two sets of upper output ends 311 and lower output ends 312, which move synchronously and reversely.

The movable wing device 2 with four combined wings is provided with two upper transmission rods 313 and two lower transmission rods 314 respectively. In order to enable that the four combined wings of the movable wing device 2 are located in the same level as much as possible, which is particularly important to the power generation by using the wave kinetic energy and low water head kinetic energy, therefore, as shown in FIG. 5, the two upper transmission rods 313 are located at the upper sides of the two lower transmission rods 314, namely, the two sets of upper transmission rods and the lower transmission rods are arranged crossly.

Preferably, the power output shaft 11 of the upper main body device passes through the upper transmission rod and the lower transmission rod in the lower main body device, the middle position of the upper and lower transmission rods is set as X-shaped space, which can ensure the easy power output of the upper layer main body device and ensure the flexible overturn of the combined wing of the lower layer main body device.

Figure 4:
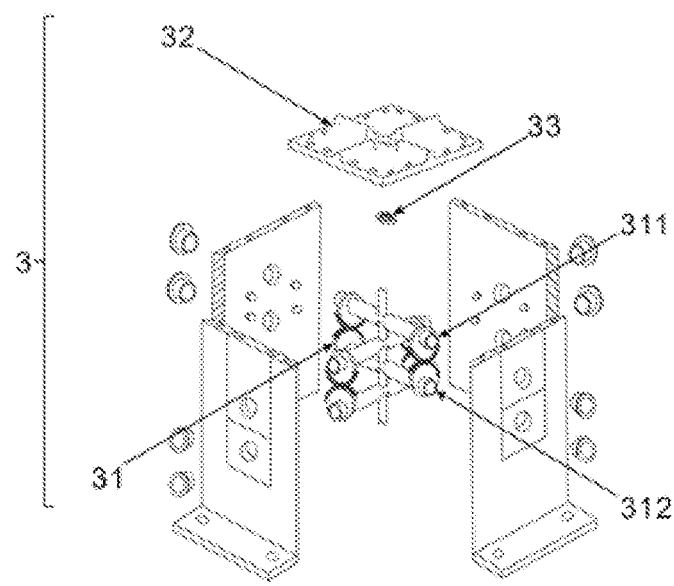
FIG. 4 is a schematic diagram of a transmission device structure of the present disclosure.
Figure 6:
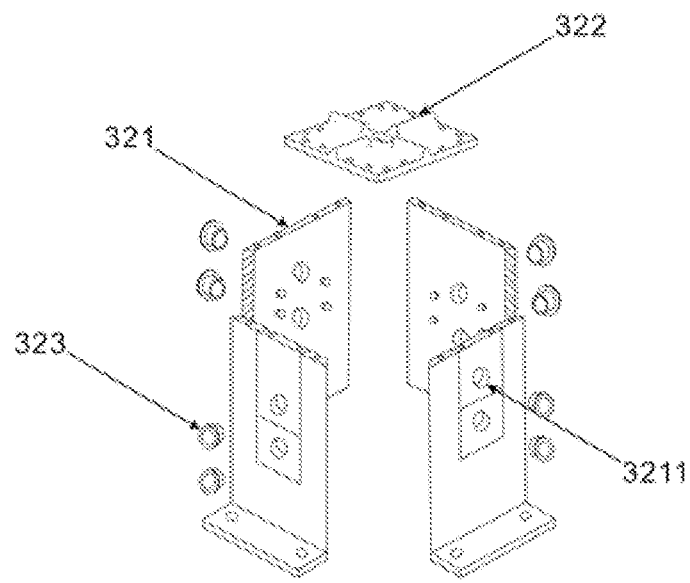
FIG. 6 is a schematic diagram of a transmission box structure of the present disclosure.
Figure 7:
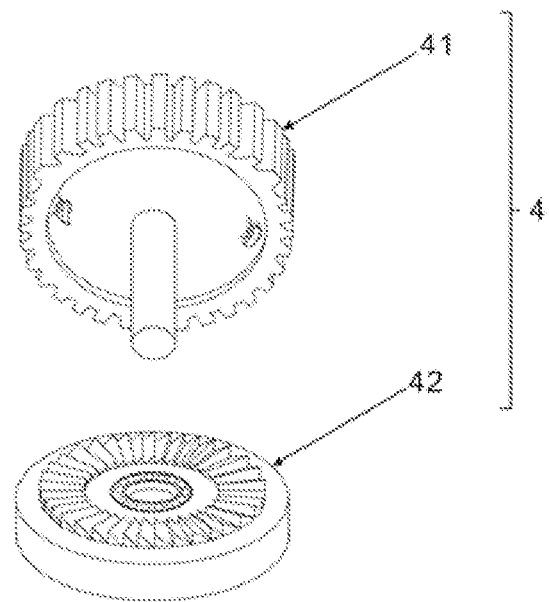
FIG. 7 is a schematic diagram of a self-clutch device structure of the present disclosure.
Figure 8:
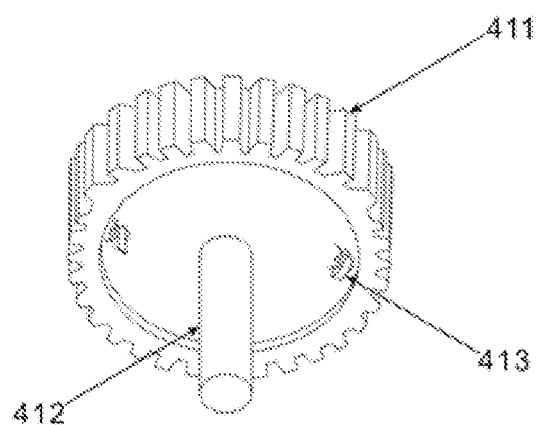
FIG. 8 is a schematic diagram of a driving disk structure of the present disclosure.
Figure 9:
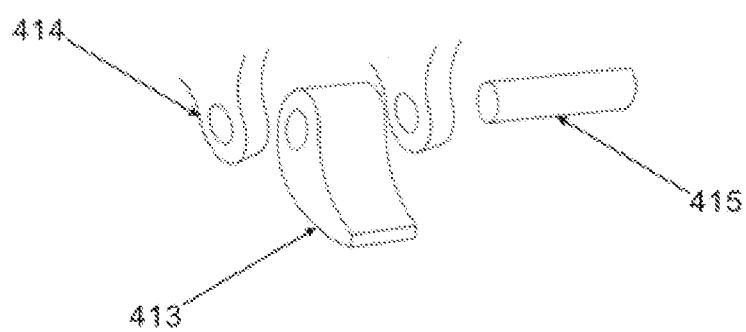
FIG. 9 is a schematic diagram of pawl installation of the present disclosure.
Figure 10:
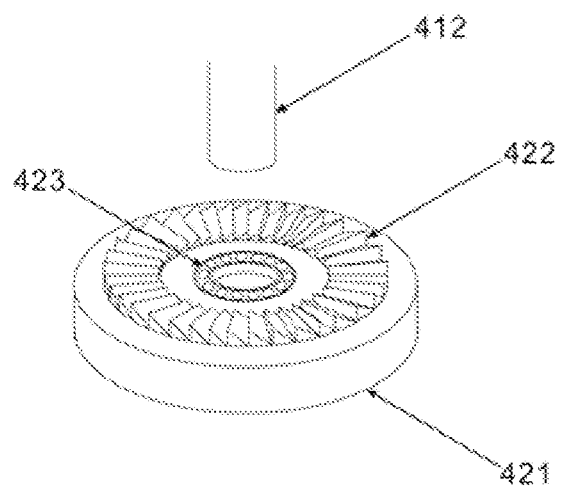
FIG. 10 is a schematic diagram of a driven disk structure of the present disclosure.

As an optional implementation mode, as shown in FIG. 4-FIG. 6, the transmission device 3 includes a transmission box 32, the transmission mechanism 31 is arranged in the transmission box 32, which includes a box body and a box cover 322 detachably arranged at the top of the box body.

The box body includes four box plates 321 connected in a circumferential direction, the box cover 322 is used for enhancing the structure of the box body and detachably connected to the tops of the box plates 321 through a screw fastening member, the power output shaft 11 passes through the middle position of the box cover 322, and the power output shaft 11 is connected to the box cover 322 by a locating bearing 33 to ensure the concentricity with the main body device.

The transmission box 32 adopts a detachable structure for convenient processing and mounting.

The two adjacent sides of each box plate 321 are provided with the detachable plates, which is convenient for the mounting and later maintenance of the inner transmission mechanism 31.

Two mounting holes 3211 are formed in the side of each box plate 321 along a vertical direction, sliding bearings 323 are arranged in the mounting holes 3211, and the end of the upper transmission rod 313 and the end of the lower transmission rod 314 are respectively arranged in the corresponding sliding bearings 323.

Figure 3:
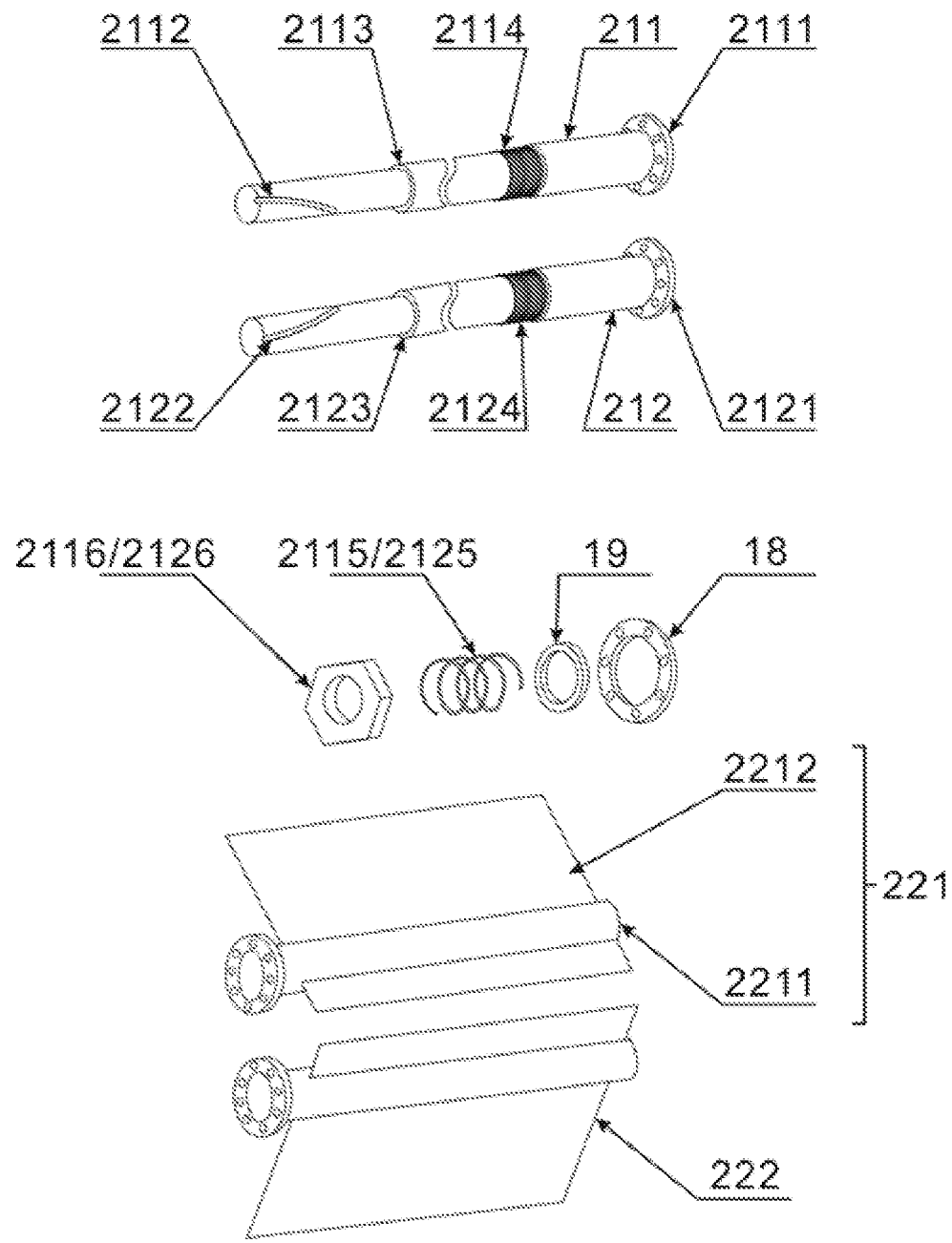
FIG. 3 is a schematic diagram of a combined wing structure of the present disclosure.

As an optional implementation mode, as shown in FIG. 3, an outer wall of a zone, in which the upper connecting rod 211 is associated with the upper output end 311, is provided with an upper spiral guide slot 2112, an upper guide key is arranged at a position where the upper transmission rod 313 corresponds to the upper spiral guide slot 2112, and the upper guide key is in sliding fit with the upper spiral guide slot 2112.

An outer wall of a zone, in which the lower connecting rod 212 is associated with the lower output end 312, is provided with a lower spiral guide slot 2122, a lower guide key is arranged at a position where the lower transmission rod 314 corresponds to the lower spiral guide slot 2122, and the lower guide key is in sliding fit with the lower spiral guide slot 2122.

The rotation direction of the lower spiral guide slot 2122 is opposite to that of the upper spiral guide slot 2112.

The upper connecting rod 211 is provided with an upper resisting portion 2113, which resists to the end face of the corresponding sliding bearing 323, an upper elastic member 2115 is sleeved on the upper connecting rod 211, and the upper elastic member 2115 adopts a spring.

The lower connecting rod 212 is provided with a lower resisting portion 2123, which resists to the end face of the corresponding sliding bearing 323, a lower elastic member 2125 is sleeved on the lower connecting rod 212, and the lower elastic member 2125 adopts a spring.

As shown in FIG. 2 and FIG. 3, the upper connecting rod 211 is provided with an upper screw 2114, the lower connecting rod 212 is provided with a lower screw 2124, an upper fastening nut 2116 and a lower fastening nut 2126 are installed on the upper connecting rod 211 and the lower connecting rod 212 respectively through the upper screw 2114 and the lower screw 2124, the two ends of the upper elastic member 2115 respectively resist to the upper fastening nut 2116 and the end cover 18 outside the corresponding upper cantilever 16, and the two ends of the lower elastic member 2125 respectively resist to the lower fastening nut 2126 and the end cover 18 outside the corresponding lower cantilever 17.

The corresponding end cover 18 of the upper cantilever 16 and the lower cantilever 17 can ensure the sealing between the connecting rod and the outside through the corresponding sealing ring 19.

The upper connecting rod 211 and the lower connecting rod 212 adopt the spiral key slot structures with the opposite structures so as to form a simple and sensitive speed regulation device. When the wind power or wave thrust is great, the centrifugal force of the movable wing device 2 overcomes the tension of the spring and drives the connecting rod to move outwards. Under the action of the upper guide key of the transmission rod, the connecting rod rotates radially, so that the downwind wing in an upright state is converted to a ">" state, and then the stress area is reduced. At the same time, the headwind wing in a horizontal state is a ">" state in a wind direction, and the resistance area is increased, thereby achieving the action of speed regulation.

As an optional implementation mode, the combined wing is in an unstable state when standby, so the combined wing is very sensitive to the action of external force. As long as ensuring weight symmetry roughly, the reliable and efficient work of the machine can be ensured. Therefore, the blade is made of degradable materials capable of ensuring the structure strength and the corrosion resistance, and the blade is green and environment-friendly.

Embodiment 2

Figure 11:
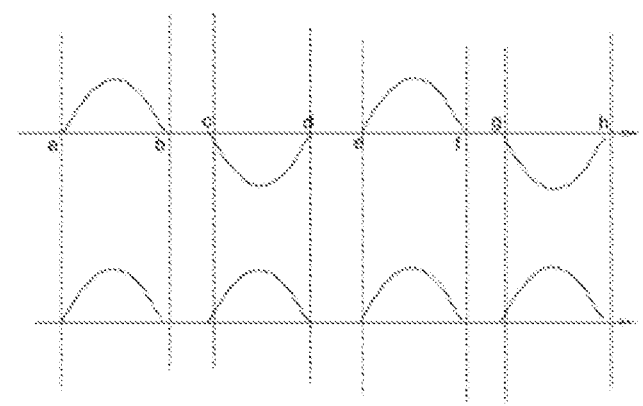
FIG. 11 is an oscillogram of the present disclosure.

The embodiment 2 is established based on the embodiment 1:

In order to enable that the present disclosure can be used for wave power generation, according to the characteristic that the wave is periodic and has a clearance period, its potential energy is similar to the waveform of the single alternating current, the double-layer reverse rotation vertical shaft power machine adopting the horizontal combined movable wing may perform "full-wave rectification" on the potential energy of the wave motion, but it is still the intermittent waveform. Therefore, the double-layer reverse rotation vertical shaft power machine further includes a self-clutch device 4, which is in transmission connection with the power output shaft through the gear transmission mechanism, as shown in FIG. 11. After the wavy potential energy is "filtered", the kinetic energy becomes more stable by the self-clutch device 4, so that the generator can generate stably, and the generation efficiency is improved effectively.

As shown in FIG. 7-FIG. 10, the self-clutch device 4 includes a driving disk 41 and a driven disk 42.

The driving disk 41 includes an output gear 411, which is in transmission connection with the main body device 1 through the gear transmission structure, and the main body device 1 drives the output gear 411 to rotate by the gear transmission structure.

A central shaft 412 and a pawl 413 are arranged on the end face of the output gear 411, and a plurality of pawls 413 are uniformly distributed.

The mounting structure of the pawl 413 is as shown in FIG. 0.9, a lifting lug 414 is arranged on the output gear 411, and the pawl 413 is mounted to the corresponding lifting lug 414 through the corresponding mounting shaft 415.

The driven disk 42 includes a flywheel 421, which is rotationally sleeved on the central shaft 412 through the driven bearing 423. Relatively to the central shaft 412, a ratchet ring 422 is annularly arranged on the end face, closing to the output gear 411, of the flywheel 421, and the pawl 413 meshes with the ratchet ring 422.

When the rotation speed of the output gear 411 is greater than that of the flywheel 421, the output gear 411 can synchronously drive the flywheel 421 to rotate. During the clearance period of the wave, when the rotation speed of the output gear 411 is less than that of the flywheel 421, the flywheel 421 continues to rotate due to the inertia effect.

In order to increase the stability of the power machine used for power generation, the inertia of the flywheel 421 may be increased, which may be achieved by increasing the quality and quantity of the flywheel 421.

In the description of the present disclosure, it is understood that orientation or position relationships indicated by the terms "upper", "lower", "inner", "outer", "top", "bottom", and the like are based on the orientation or position relationships as shown in the drawings, for ease of describing the present disclosure and simplifying the description only, rather than indicating or implying that the mentioned apparatus or element necessarily has a particular orientation and must be constructed and operated in the particular orientation. Therefore, these terms should not be understood as limitations to the present disclosure.

In addition, the terms "first" and "second" are merely used for description, instead of being understood as indicating or implying relative importance or impliedly indicating the quantity of the showed technical features. Thus, the features defined with "first" and "second" may expressly or impliedly one or more features. In the description of the present disclosure, "a plurality of" and "many" mean two or three, unless specific limitation otherwise.

In this application, unless specific regulation and limitation otherwise, terms "install", "join", "connect", "fix" and the like should be generally understood, for example, may be a fixed connection, a detachable connection, or integrated, may be a direct connection or an indirect connection through an intermediation, and may an internal connection of two elements or an interactive relationship of two elements, unless specific limitation otherwise. Those of ordinary skill in the art may understand the specific meaning of the terms in the disclosure according to specific conditions.

In conclusion, the above is only the specific implementation mode of the present disclosure, but the scope of protection of the present disclosure is not limited to this. Those skilled in the art can easily think of changes or replacements within the scope of the technology disclosed in the present disclosure, which shall be covered by the scope of protection of the present disclosure. Therefore, the scope of protection of the present disclosure should be subject to the scope of protection of the appended claims.

What is claimed is:

1. A double-layer reverse rotation vertical shaft power machine adopting a horizontal combined movable wing, comprising movable wing devices arranged on main body devices;
    wherein each main body device comprises a main body and a power output shaft that are coaxially arranged, and a transmission device is arranged in the main body; and
    wherein each movable wing device comprises combined wings that are uniformly arranged along a circumferential direction of a corresponding main body, each combined wing comprises combined shafts and combined movable wings connected to the combined shafts, and the combined shafts distributed in a circumferential direction are alternately arranged in turn according to an axial length,
    wherein when the double-layer reverse rotation vertical shaft power machine adopting the horizontal combined movable wing is used for wave power generation, the power machine further comprises a self-clutch device, which comprises a driving disk and a driven disk,
    wherein the driving disk comprises an output gear, which is in transmission connection with the main body device, and a central shaft and a pawl are arranged on the end face of the output gear; and
    wherein the driven disk comprises a flywheel, which can be rotationally sleeved on the central shaft, and relatively to the central shaft, a ratchet ring is annularly arranged on the end face, closing to the output gear, of the flywheel, and the pawl meshes with the ratchet ring.

2. The double-layer reverse rotation vertical shaft power machine adopting the horizontal combined movable wing according to claim 1, wherein a quantity of each layer combined wing is four; and
    wherein two symmetrically arranged combined wings are in transmission connection through a transmission device.

3. The double-layer reverse rotation vertical shaft power machine adopting the horizontal combined movable wing according to claim 2, wherein the transmission device comprises a transmission mechanism, wherein two opposite sides of the transmission mechanism are provided with upper output ends and lower output ends that rotate synchronously and reversely, each combined shaft comprises an upper cantilever and a lower cantilever that are arranged in parallel as well as an upper connecting rod and a lower connecting rod that are respectively arranged in the upper cantilever and the lower cantilever, and each combined movable wing comprises an upper wing mechanism and a lower wing mechanism;

wherein one end of the upper connecting rod is connected to a corresponding upper output end, and the other end of the upper connecting rod is in flange connection with a corresponding upper wing mechanism through an upper flange plate; and wherein one end of the lower connecting rod is connected to a corresponding lower output end, and the other end of the lower connecting rod is in flange connection with a corresponding lower wing mechanism through a lower flange plate.

4. The double-layer reverse rotation vertical shaft power machine adopting the horizontal combined movable wing according to claim 3, wherein the transmission mechanism comprises an upper transmission rod and a lower transmission rod, wherein the two ends of the upper transmission rod are provided with upper transmission gears, the two ends of the lower transmission rod are provided with lower transmission gears, and the corresponding upper transmission gears mesh with the lower transmission gears; and wherein the two ends of the upper transmission rod are formed with two upper output ends, and the two ends of the lower transmission rod are formed with two lower output ends.

5. The double-layer reverse rotation vertical shaft power machine adopting the horizontal combined movable wing according to claim 2, wherein a blade of the combined wing is made of degradable materials.

\* \* \* \* \*